(12) United States Patent
Deng et al.

(10) Patent No.: US 9,851,814 B2
(45) Date of Patent: Dec. 26, 2017

(54) FOLDABLE MOUSE

(71) Applicants: Tsinghua University, Beijing (CN); HON HAI PRECISION INDUSTRY CO., LTD., New Taipei (TW)

(72) Inventors: Lei Deng, Beijing (CN); Ying-Ri Sun, Beijing (CN); Guang-Hong Han, Beijing (CN); Ling Zhang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/174,967

(22) Filed: Jun. 6, 2016

(65) Prior Publication Data

US 2016/0364020 A1 Dec. 15, 2016

(30) Foreign Application Priority Data

Jun. 12, 2015 (CN) .......................... 2015 1 0321792

(51) Int. Cl.
  *G06F 3/033* (2013.01)
  *G06F 3/0354* (2013.01)
(52) U.S. Cl.
  CPC ................ *G06F 3/03543* (2013.01)
(58) Field of Classification Search
  USPC ........................................................ 345/163
  See application file for complete search history.

(56) References Cited

U.S. PATENT DOCUMENTS

| | | | | |
|---|---|---|---|---|
| 8,648,806 B2* | 2/2014 | Ma | ...................... | G06F 3/03543 345/163 |
| 2004/0012568 A1* | 1/2004 | Velikov | ................. | G06F 1/1616 345/163 |
| 2005/0116934 A1* | 6/2005 | Yin | ...................... | G06F 3/03543 345/163 |
| 2006/0176277 A1* | 8/2006 | Daniel | .................. | G06F 3/0317 345/163 |
| 2010/0295786 A1* | 11/2010 | Ai | ....................... | G06F 3/03543 345/163 |
| 2015/0116221 A1* | 4/2015 | Chen | ................... | G06F 3/03543 345/163 |

OTHER PUBLICATIONS

DAMNFAT2000,The Flat CD Mouse,Chinese VR-Zone,Sep. 9, 2012,Taiwan.
Radhika Seth,Flat Pack Mouse, Yanko Design,Aug. 27, 2012.

* cited by examiner

*Primary Examiner* — Roy Rabindranath
(74) *Attorney, Agent, or Firm* — ScienBiziP, P.C.

(57) ABSTRACT

A foldable mouse comprises a substrate, a thin-film battery, a touch module, a signal processing module, and a communication module. The substrate is a foldable structure. The thin-film battery is electrically connected to the touch module, the signal processing module, and the communication module; the signal processing module drives the touch module, receives signals from the touch module, and sends the signals to the communication module. The substrate comprises a main body structure sandwiched between a first support plate and a second support plate. The first support plate and the second support plate are symmetrically located at two opposite sides of the main body and foldable connected to the main body structure. The main body structure comprises a first surface and a second surface, and a minidisc is integrated on the second surface.

19 Claims, 9 Drawing Sheets

FOLDABLE MOUSE

CROSS-REFERENCE TO RELATED APPLICATIONS

This application claims all benefits accruing under 35 U.S.C. §119 from China Patent Application No. 201510321792.7, filed on Jun. 12, 2015, in the China Intellectual Property Office, the disclosure of which is incorporated herein by reference.

BACKGROUND

1. Technical Field

The present disclosure relates to a foldable mouse, particularly to a foldable mouse integrated with optical disc.

2. Description of Related Art

In 1968, the world's first mouse is displayed on IEEE conference in San Francisco, the shape of the original mouse is a big heavy box. Since the birth of the mouse, its shape and structure has been constantly changed. These changes make the mouse more comfortable, more ergonomic, and more convenient to carry.

In the 21st century, with the development of science and technology, the mouse has been popular to people's daily life. For the ergonomic design, the current mouse are designed in an arched shape, the area of the bottom surface is half of the palm area, and the height generally ranges between 3 cm~5 cm. However, the volume of the mouse is still too large. Thus it is inconvenient to be directly put into the pocket. Furthermore, if the mouse is placed into the briefcases, the computer bags, and other small packages, the arched shape will lead to local uplift of the package. This will bring inconvenience to carry.

What is needed, therefore, is to provide a foldable mouse for solving the problem discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
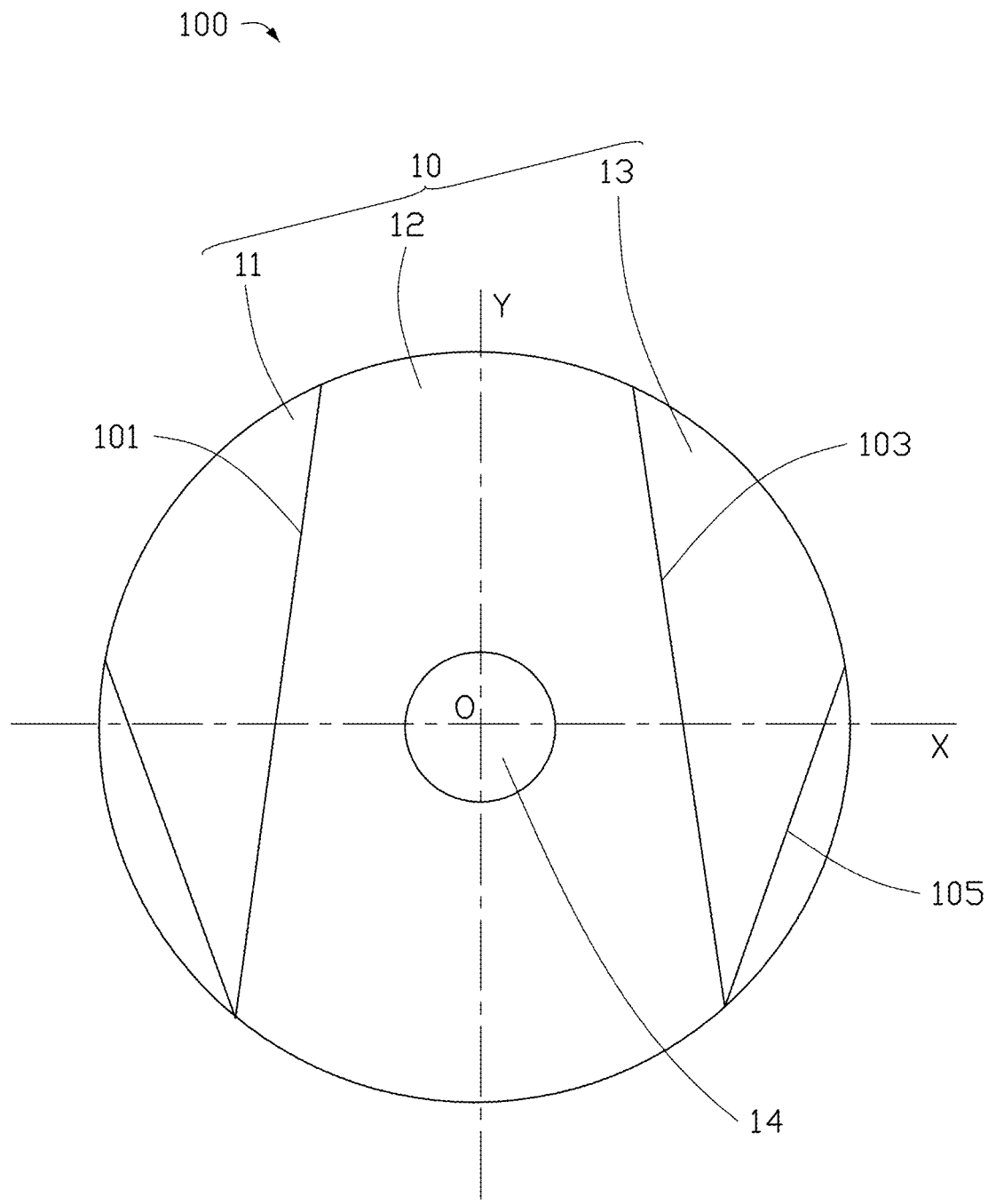
FIG. 1 is a schematic view of one embodiment of a front view of a foldable mouse.
Figure 2:
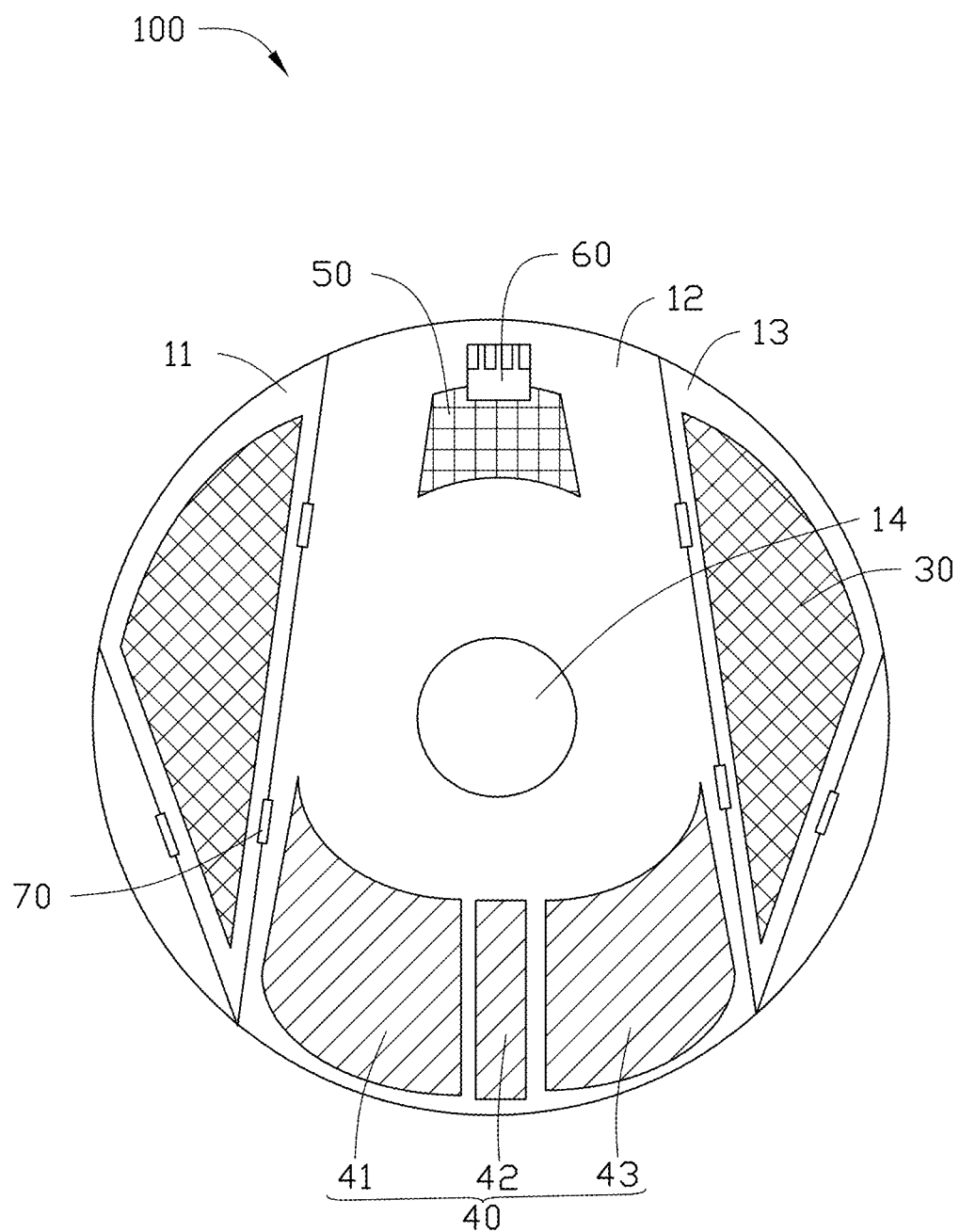
FIG. 2 is a schematic rear view of the foldable mouse of FIG. 1.
Figure 3:
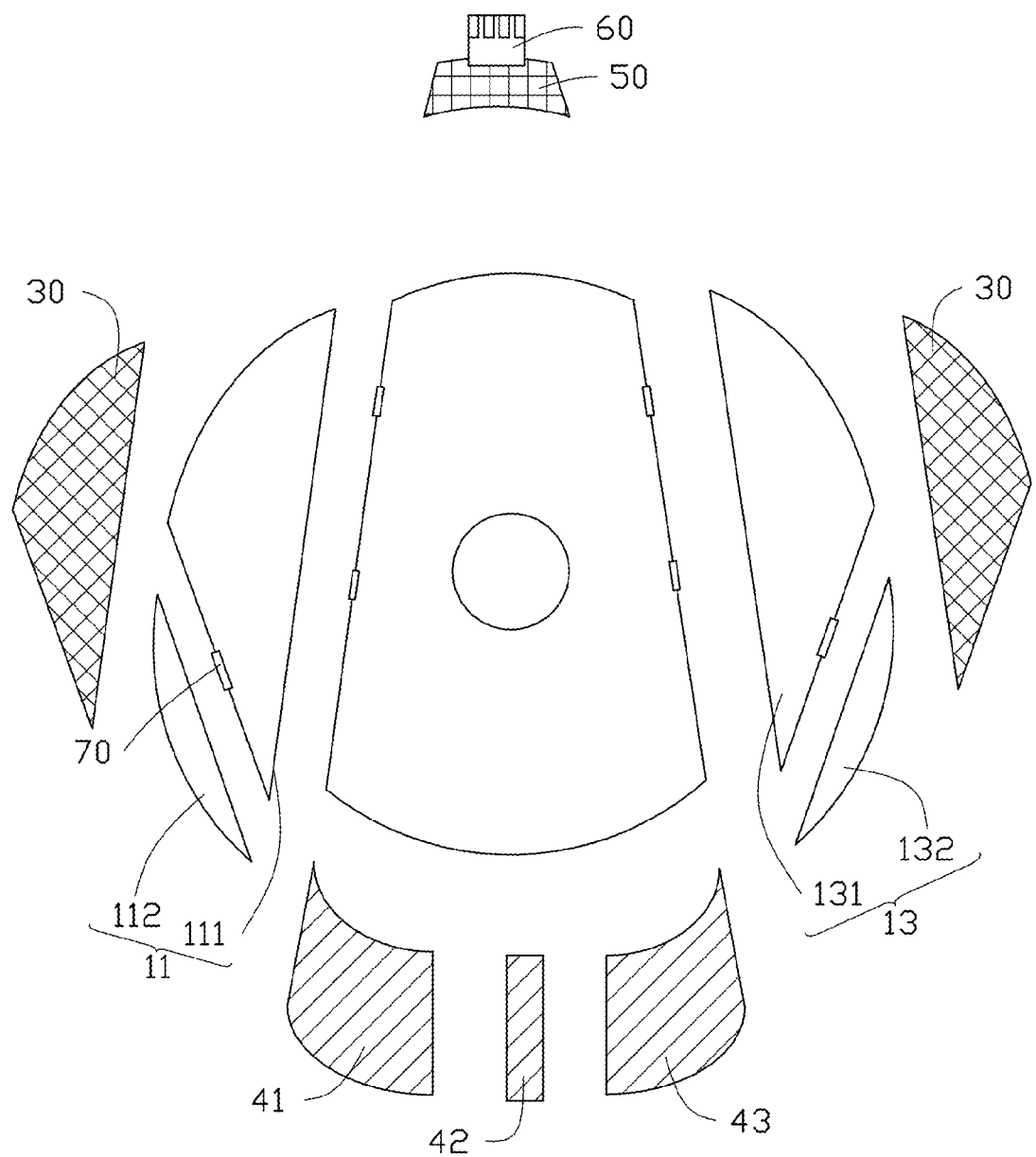
FIG. 3 shows a schematic exploded view of the foldable mouse of FIG. 1.

Referring to FIG. 1 to FIG. 3, one embodiment of a foldable mouse 100 comprises a substrate 10, a thin-film battery 30, a touch module 40, a signal processing module 50, and a communication module 60. The thin-film battery 30, the touch module 40, the signal processing module 50, and the communication module 60 are located on the substrate 10.

A material of the substrate 10 can be a transparent material or opaque material. The substrate 10 can be an insulating substrate. Furthermore, the substrate 10 has a certain mechanical strength in order to provide support for other elements. In addition, the substrate can support its own weight and can maintain its shape after being folded. The material of the substrate 10 can be polyester materials such as polycarbonate (PC), polymethyl methacrylate (PMMA), polyethylene (PE), polyimide (PI), or polyethylene terephthalate (PET). The material of the substrate 10 can also be polyether sulfone (PES), cellulose ester, polyvinyl chloride (PVC), benzocyclobutene (the BCB), or acrylic resin. In one embodiment, the material of the substrate 10 is PET.

The substrate 10 can be a sheet structure for supporting the thin-film battery 30, the touch module 40, the signal processing module 50, and the communication module 60. In one embodiment, the shape of the substrate 10 can be an axisymmetric structure. Furthermore, the shape of the substrate 10 can be a centrosymmetric structure such as rhombus, rectangular, square, oval, or circular. A thickness of the substrate 10 can range from about 1 millimeter to about 3 millimeters. In one embodiment, the shape of the substrate 10 is circular. A diameter of the substrate can be less than or equal to 12 centimeters, thus it is convenient to be incorporated into the optical drive of computers or other electronic equipment. In one embodiment, the shape of the substrate 10 is circular, with a diameter of 12 centimeters and a thickness of 2 millimeters.

The substrate 10 can define a through hole 14. The through hole 14 penetrates the substrate 10 along the thickness direction of the substrate 10. The shape of the through hole 14 can be a axisymmetric structure or a centrosymmetric structure. While the substrate 10 is the axisymmetric structure, the through hole 14 can be located on the symmetry axis of the substrate 10. Thus the symmetry axis of the through hole 14 is coincident with the symmetry axis of the substrate 10. While the substrate 10 is the centrosymmetric structure, the through hole 14 can be defined at the center of the substrate 10. In one embodiment, the through hole 14 is a circular. A size of the through hole 14 can be selected according to the size of the substrate 10, in order to that the substrate 10 can have enough space to carry the thin-film battery 30, the touch module 40, the signal processing module 50, and the communications module 60. A pore diameter of the through hole 14 can range from about 5 millimeters to about 25 millimeters. In one embodiment, the shape of the through hole 14 is circular, and the center of the through hole 14 is coincident with the center of the substrate 10, and the pore diameter of the through hole is about 15 millimeters.

The substrate 10 is a foldable structure. The substrate 10 defines a first folding line 101 and a second folding line 103. The substrate 10 is divided into at least three sections by the first folding line 101 and the second folding line 103. In one embodiment, the substrate 10 is circular. The first folding line 101 and the second folding line 103 extend along two strings of the substrate 10. Furthermore, the first folding line 101 and the second folding line 103 are symmetrically distributed at two opposite sides of the symmetric axis of the substrate 10. The first folding line 101 is spaced from the second folding line 103, thus the first folding line 101 and the second folding line 103 does not intersect with each other on the surface of the substrate 10. In addition, the extension lines of the first folding line 101 and the second folding line 103 can be intersected with each other. Furthermore, the first folding line 101 and the second folding line 103 can be parallel to each other. The distance between the first folding line 101 and the second folding line 103 can be selected according to the size of the through hole 14. In one embodiment, the extension lines of the first folding line 101 and the second folding line 103 are intersected with each other.

In detail, the substrate 10 is divided into a main body structure 12, a first support plate 11, and a second support plate 13 by the first folding line 101 and the second folding line 103. The main body structure 12 is located between the first folding line 101 and the second folding line 103, and sandwiched between the first support plate 11 and the second support plate 13. The first folding line 101 and the second folding line 103 can cut through the substrate 10 along the thickness direction of the substrate 10. Thus the main body structure 12, the first support plate 11, and the second support plate 13 are spaced apart from each other. In one embodiment, the first folding line 101 and second folding line 103 merely cut into a portion of the substrate 10 along the thickness. Thus the main body structure 12, the first support plate 11, and the second support plate 13 are not completely cut off from each other, and the first support plate 11 and the second support plate 13 are connected to the main body structure 12. The first support plate 11 can rotate around the first folding line 101, and the second support plate 13 can rotate around the second folding line 103 to form a folded structure.

In one embodiment, the main body structure 12, the first support plate 11, and the second support plate 13 are spaced apart from each other. The contour of the main body structure 12, the first support plate 11, and the second support plate 13 can be circular after they are combined together. The main body structure 12 is located between the first support plate 11 and the second support plate 13. Furthermore, the main body structure 12 is an axisymmetric structure. The first support plate 11 and the second support plate 13 are symmetrically distributed at two opposite sides of the main body structure 12 related to the symmetric axis of the main body structure 12. For description, a direction of the symmetry axis of the main body structure 12 is defined as the X-axis direction, and a direction perpendicular to the X-axis direction is defined as Y-axis direction.

The shape of the main body structure 12 can be selected according to the touch module 40, the signal processing module 50, and communication module 60, ensuring that the main body structure 12 can accommodate them and have a good feel. The main body structure 12 comprises a first end and a second end along the X-axis direction. A first width of the first end can be smaller than a second width of the second end. Thus the shape of the main body structure 12 is similar to a trapezoidal structure. Both the first support plate 11 and the second support 13 are fan-shaped structures on two opposite sides of the main body structure 12. In one embodiment, the first width is about 4 centimeters, and the second width is about 8 centimeters.

The main body structure 12 has a first surface and a second surface opposite to the first surface. The first support plate 11 and the second support plate 13 can be folded toward the second surface. The touch module 40, the signal processing module 50, and the communication module 60 can be located in the second surface of the main body structure 12. The touch module 40 can be located at the second end of the main body structure 12. The signal processing module 50 and communication module 60 can be located on the first end of the main body structure 12.

The touch module 40 can be a capacitive touch module or a resistive touch module. In this embodiment, the touch module 40 is the capacitive touch module. The touch module 40 can comprise a first carbon nanotube film 41, a second carbon nanotube film 42, and a third carbon nanotube film 43 attached on the second surface of the main body structure 12. The touch module 40 is configured to sense control input signal. The first carbon nanotube film 41, the second carbon nanotube film 42, and the third carbon nanotube film 43 are spaced from each other and configured as a right button, a middle button, and a left button of the mouse respectively. In detail, the second carbon nanotube film 42 is located along the axis of symmetry of the main body structure 12. The first carbon nanotube film 41 and the third carbon nanotube film 43 can be symmetrically distributed on the second carbon nanotube film 42. The shape of the first carbon nanotube film 41, the second carbon nanotube film 42, and the third carbon nanotube film 43 can be selected according to actual needs (such as the size of different mouse and the size of palm) to facilitate control.

Furthermore, the first carbon nanotube film 41, the second carbon nanotube film 42, and third carbon nanotube film 43 can be connected together to form a unitary structure. Thus the first carbon nanotube film 41, the second carbon nanotube film 42, and the third carbon nanotube film 43 can be different areas of a single carbon nanotube film. In one embodiment, the first carbon nanotube film 41, the second carbon nanotube film 42, and the third carbon nanotube film 43 are spaced apart from each other.

Figure 4:
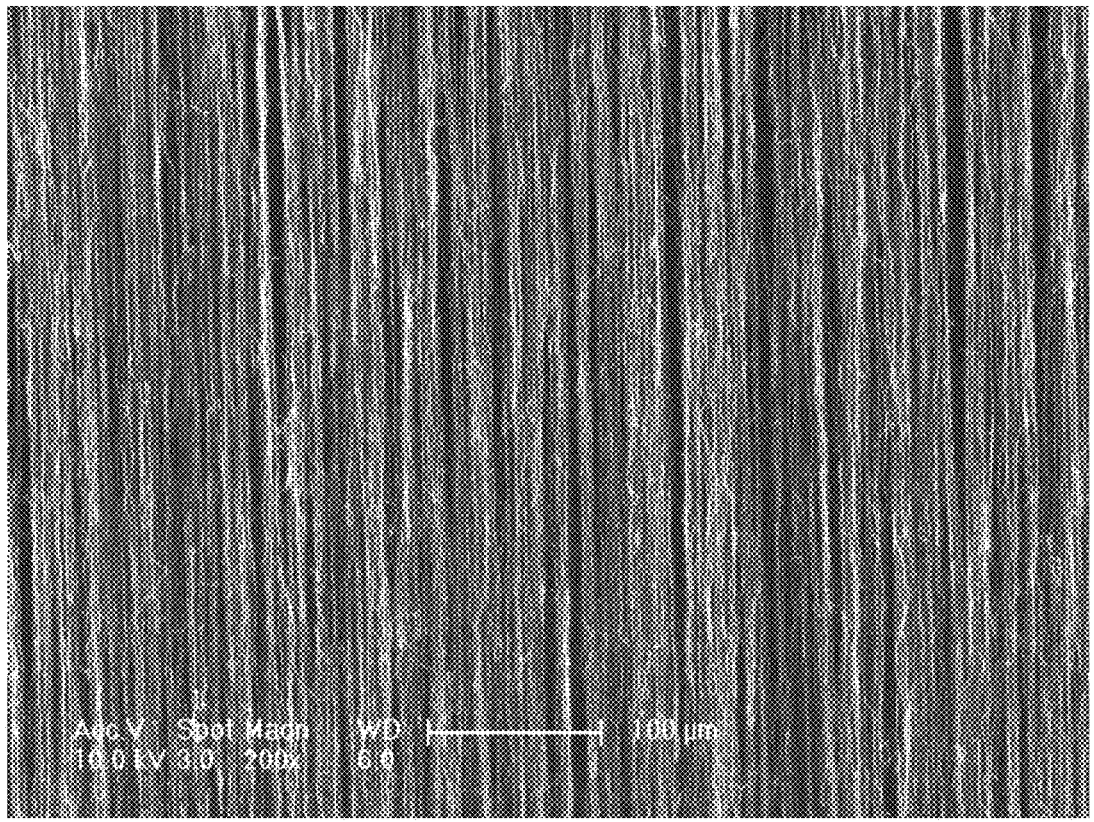
FIG. 4 shows a Scanning Electron Microscope (SEM) image of one embodiment of a carbon nanotube film in the foldable mouse of FIG. 1.

The carbon nanotube film can have anisotropic impedance. Referring to FIG. 4, the carbon nanotube film can be made of a plurality of carbon nanotubes (CNT). The carbon nanotube film can be a free-standing structure. The carbon nanotube film comprises a plurality of carbon nanotubes oriented along a preferred orientation, meaning that a large number of the carbon nanotubes in the carbon nanotube drawn film are arranged substantially along the same direction. The plurality of carbon nanotubes are parallel with the surface of the carbon nanotube film. An end of one carbon nanotube is joined to another end of an adjacent carbon nanotube arranged substantially along the same direction, by Van der Waals attractive force. A small number of the carbon nanotubes can be randomly arranged in the carbon nanotube film, and has a small if not negligible effect on the larger number of the carbon nanotubes in the carbon nanotube film arranged substantially along the same direction. The carbon nanotube film is capable of forming a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube film is placed between two separate supporters, a portion of the carbon nanotube film, not in contact with the two supporters, would be suspended between the two supporters and yet maintain film structural integrity. The free-standing structure of the carbon nanotube film is realized by the successive carbon nanotubes joined end to end by Van der Waals attractive force.

It can be appreciated that some variation can occur in the orientation of the carbon nanotubes in the carbon nanotube film as can be seen in FIG. 4. Microscopically, the carbon nanotubes oriented substantially along the same direction cannot be perfectly aligned in a straight line, and some curved portions can exist. It can be understood that some carbon nanotubes located substantially side by side and oriented along the same direction being contact with each other cannot be excluded.

More specifically, the carbon nanotube film comprises a plurality of successively oriented carbon nanotube segments joined end-to-end by Van der Waals attractive force therebetween. Each carbon nanotube segment comprises a plurality of carbon nanotubes substantially parallel to each other, and joined by Van der Waals attractive force therebetween. The carbon nanotube segments can vary in width, thickness, uniformity, and shape. The carbon nanotubes in the carbon nanotube film are also substantially oriented along a preferred orientation.

In one embodiment, the carbon nanotube film can be drawn out from an array of carbon nanotubes. The carbon nanotube film can be formed by selecting one or more carbon nanotubes having a predetermined width from the array of carbon nanotubes, and pulling the carbon nanotubes at a roughly uniform speed to form carbon nanotube segments that are joined end to end to achieve a uniform carbon nanotube film.

The carbon nanotube segments can be selected by using a tool, such as adhesive tape, pliers, tweezers, or other tools allowing multiple carbon nanotubes to be gripped and pulled simultaneously to contact with the array of carbon nanotubes. Each carbon nanotube segment comprises a plurality of carbon nanotubes substantially parallel to each other, and combined by Van der Waals attractive force therebetween. The pulling direction can be substantially perpendicular to the growing direction of the array of carbon nanotubes.

The carbon nanotube film has the smallest resistance at the pulling direction, and the largest resistance at a direction substantially perpendicular to the pulling direction. Furthermore, the carbon nanotube film can be irradiated with laser to reduce the thickness of the carbon nanotube film. The transparency of the carbon nanotube film can be improved.

Furthermore, the carbon nanotube film can be attached to the substrate 10 via an adhesive layer (not shown). The adhesive layer can be transparent or opaque. The adhesive layer has low melt point. The thickness of the adhesive layer ranges from about 10 nanometers to about 50 micrometers. The material of adhesive layer can be ultraviolet rays glue, PVC or PMMA. In one embodiment, the thickness of the adhesive layer ranges from about 2 micrometer to about 2 micrometers. In another embodiment, the thickness of the adhesive layer is about 1.5 micrometers.

The signal processing module 50 is located on the first end of the main body structure 12, and attached to the second surface of the main body structure 12. The signal processing module 50 is electrically connected with the touch module 40. The signal processing module 50 is used to drive the touch module 40, receive the sensed control signal, process the control signal, and transmit the signal to the communication module 60 or other electronic devices. The signal processing module 50 can be a printed circuit board (PCB) integrated with a plurality of processing chips and integrated circuits.

The communication module 60 is electrically connected to the signal processing module 50, and transmits the control signal processed by the signal processing module 50 to other electronic devices to control other electronic devices. The communication module 60 can be a wired communication module or wireless communication module. The wired communication module can be a USB communication module. The wireless communication module can be an infrared transmitter, a Bluetooth transmitter, a Wifi emitters, or a 2.4 G transmitter. The wireless communication module can transmit the signal output from the signal processing module 50 to other electronic equipment in order to control the electronic device. In one embodiment, the communication module 60 is the 2.4 G transmitter.

The first support plate 11 and the second support plate 13 are symmetrically distributed at two opposite sides of the main body structure 12. The first support plate 11, the second support plate 13, and the main body structure 12 combined together to form the substrate 10. The first support plate 11 and the second support plate 13 can have the same shape and the same area, in order to stably support the folded main body structure 12. In one embodiment, since the structure of the main body structure 12 of the inverted trapezoid approximation, both the shape of the first support plate 11 and the second support plate 13 are arc, so as to form the circular structure with the main body structure 12.

The first support plate 11 and the second support plate 13 is rotatable and connected to the main body structure 12. In detail, while the first support plate 11 and the second support plate 13 are unfolded, the first support plate 11 and the second support plate 13 can be coplanar with the main body structure 12. Furthermore, the first support plate 11 and the second support plate 13 can be folded to form a three-dimensional structure with the main body structure 12. The main body structure 12 is supported and suspended on the first support plate 11 and the second support plate 13 at the folded state. The first support plate 11 is rotated around the first folding line 101, and the second support plate 13 is rotated around the second folding line 103. While the first support plate 11 and the second support plate 13 are folded, an angle θ can be formed between first support plate 11, the second support plate 13, and the main body structure 12. The angle θ can be greater than 0 degrees and less than or smaller than 90 degrees. In one embodiment, the angle θ is 90 degrees, thus both the first support plate 11 and the second support plate are perpendicular to the main body structure 12.

The first support plate 11 and the second support plate 13 is used to support the main body structure 12. While the first support plate 11, and the second support plate 13 are spaced apart from the main body structure 12, the first support plate 11 and the second support plate 13 can be connected to the main body structure via a rotating shaft, springs, screws, or hinges. In one embodiment, the first support plate 11 is connected to the main body structure 12 via two micro-hinges 70 along the first folding line 101. The second support plate 13 is connected to the main body structure 12 via another two micro-hinges 70 along the second folding line 103. Thus the four micro-hinges 70 can be symmetrically distributed at two opposite sides of the main body structure 12.

Furthermore, both the first support plate 11 and the second support plate 13 comprise two parts respectively. Because the shape of the first support plate 11 and the second support plate 13 are the same and symmetrically distributed on two opposite sides of the main body structure 12, thus the second support plate 13 is taken as the example for description. The second support plate 13 comprises a first sub-support plate 131 and a second sub-support plate 132 spaced from each other. The first sub-support plate 131 can be connected to the second sub-support plate 132 via the micro-hinge 70. The first sub-support plate 131 is connected to the main body structure 12 via two micro-hinges 70. The second sub-support plate 132 is capable of being folded toward the second surface of the main body structure 12 around the micro-hinge 70. The second sub-support plate 132 can been folded to form a support surface, thus the foldable mouse 100 can be smoothly placed on other plane surface, and it is more convenient to operate. The second sub-support plate 132 can be smaller than the first sub-support plate 131, thus the foldable mouse 100 can have a sufficient height in the folded state. An area ratio between the second sub-support plate 132 and the first sub-support plate 131 can range from 1/10 to 1/5. The first sub-support plate 131 and the second sub-support plate 132 can be divided by a third folding line 105, and the third folding line 105 is intersected with the second folding line 103 at the second end of the main body structure 12. Similarly, the first support plate 11 also comprises a third sub-support plate 111 and a fourth sub-support plate 112.

The thin-film battery 30 is located on the surface the substrate 10. The thin-film battery 30 can be located on the main body structure 12, the first support plate 11, or the second support plate 13. Furthermore, the thin-film battery 30 is at least attached to the surface of the first support plate 11. In one embodiment, the thin-film battery 30 is attached both to the first support plate 11 and the second support plate 13. Furthermore, the thin-film battery 30 can be attached to the third sub-support plate 111 and the first sub-support plate 131. The thin-film battery 30 is electrically connected to the touch module 40, the signal processing module 50, and the communication module 60, and configured to provide energy to them. The thin-film battery 30 can be a thin-film solar cells, a thin film lithium-ion battery, or other type of thin film batteries. In one embodiment, the thin-film battery 30 is a thin film lithium ion battery.

Figure 5:
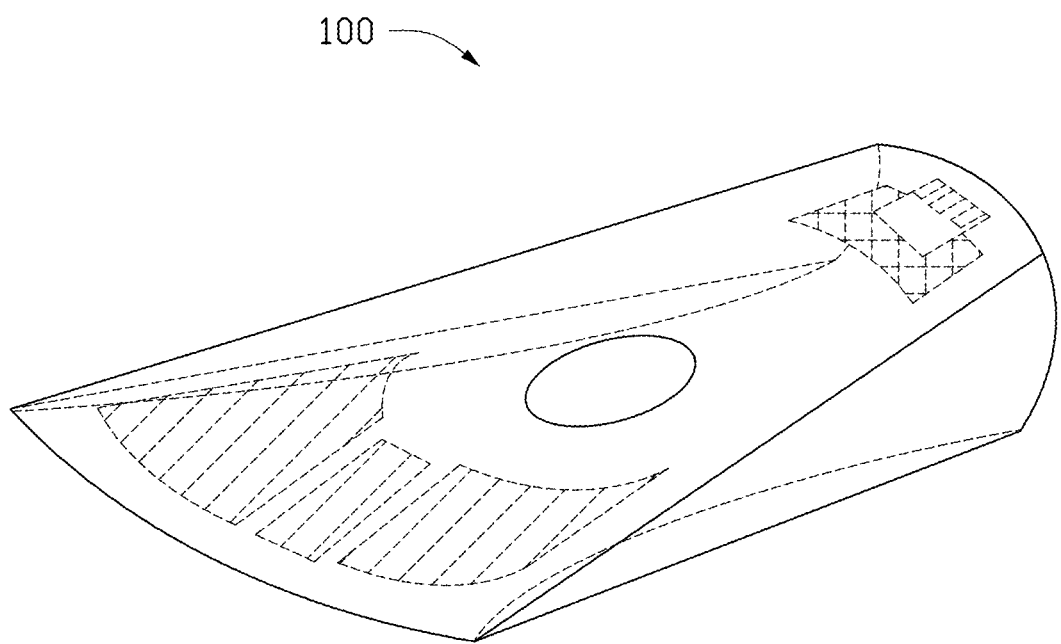
FIG. 5 shows a schematic view of one embodiment of the foldable mouse of FIG. 1 in the folded state.

Referring to FIG. 5, while the foldable mouse 100 is in the folded state, the first support plate 11 and the second support plate 13 of the main body structure 12 provides support for the main body structure 12. At least a portion of the main body structure 12 is suspended above the first support plate 11 and the second support plate 13 to form the three-dimensional structure, thus the foldable mouse 100 is convenient for grasping. Furthermore, after the foldable mouse 100 is folded, all the thin-film battery 30, the touch module 40, the signal processing module 50, and communications modules 60 are located on an inner surface of the foldable mouse 100, and an outer surface of the foldable mouse 100 is used for gripping and touch. At the same time, the fourth sub-support plate 112 and the second sub-support plate 132 have been folded and affixed to the surface where the foldable mouse 100 is place on. Thus they can further provide a more stable support for the foldable mouse 100. In addition, because the extension lines of the first folding line 101 and the second folding line 103 are intersected with each other, thus the foldable mouse 100 can form an inclined structure to improve the hand feel of the foldable mouse 100. By moving the foldable mouse 100 and touching the touch module 40, the foldable mouse 100 can be used to control other electronic devices such as computer. While the foldable mouse 100 is not used, it can be unfolded to form a flat state. Thus it can be easily and conveniently put into a bag, a pocket, or clipped into a book, and it is convenient for storage. Furthermore, since because the foldable mouse 100 is a disc-shaped structure in unfolded state, thus the foldable mouse 100 can also be directly placed into the disc drive of the computer or other electronic equipment. The space can be dramatically saved, and the foldable mouse 100 is convenient to store and use. The portability of the foldable mouse 100 can be improved.

It can be understood that, the thin-film battery 30, the touch module 40, the signal processing module 50, and communications modules 60 can also be integrated into the interior of the substrate 10. Furthermore, the thin-film battery 30, the touch module 40, the signal processing module 50, and communication module 60 can also be attached on different surfaces of the substrate 10 according to actual needs without affecting the function of the foldable mouse 100.

Figure 6:
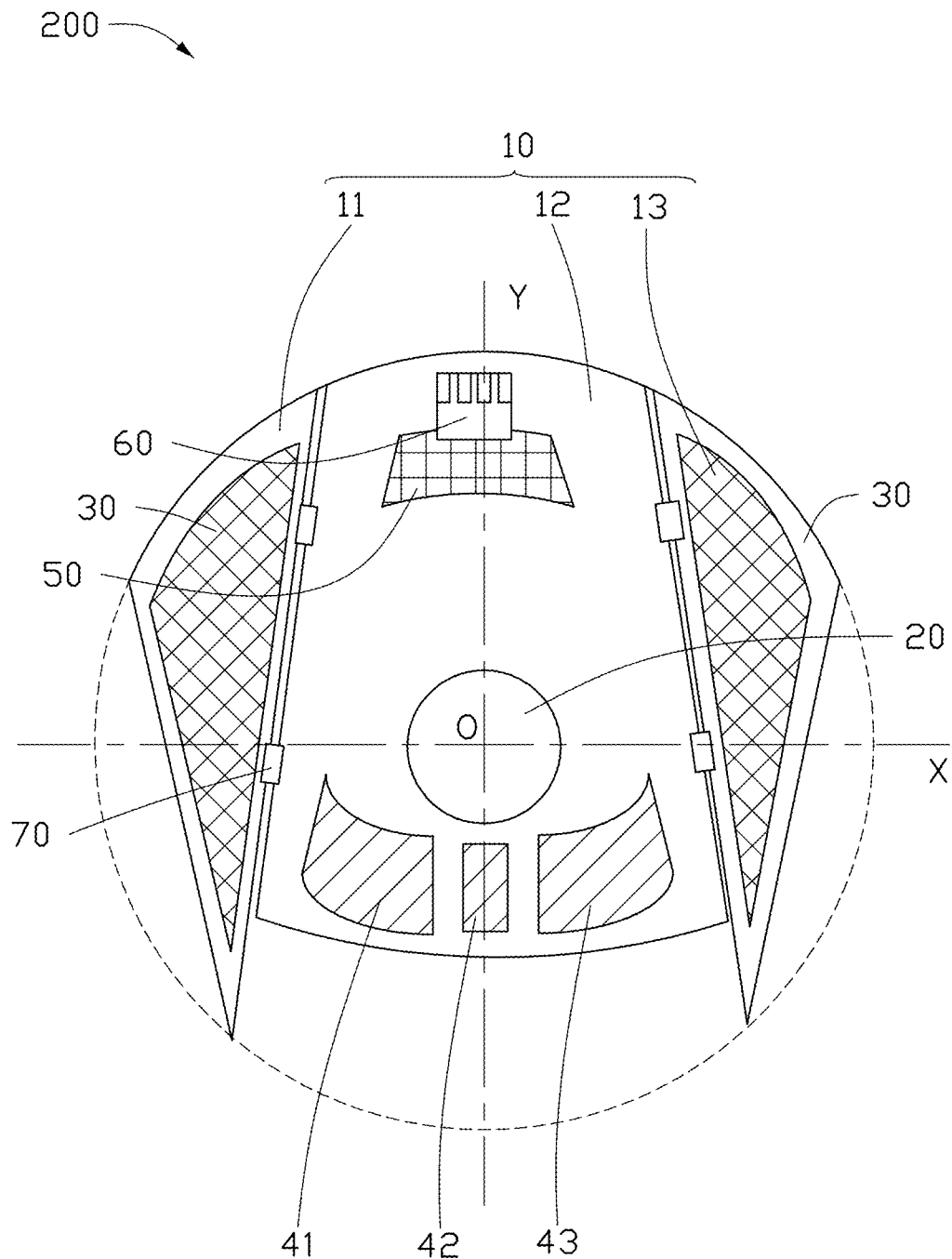
FIG. 6 shows a schematic view of another embodiment of a front view of a foldable mouse.
Figure 7:
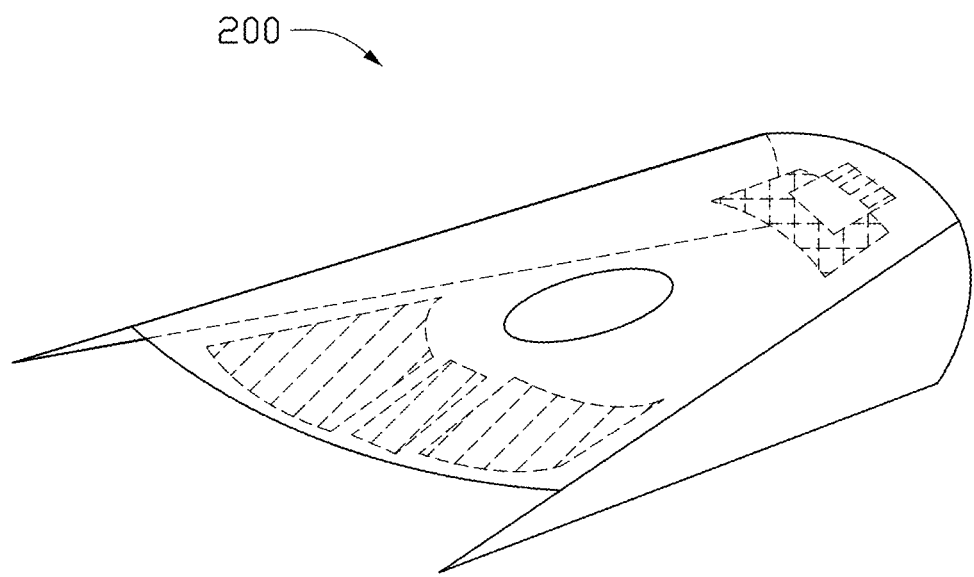
FIG. 7 shows a schematic view of one embodiment of the foldable mouse of FIG. 6 in the folded state.

Further referring to FIGS. 6 and 7, one embodiment of a foldable mouse 200 comprises a substrate 10, a thin-film battery 30, a touch module 40, a signal processing module 50, and a communication module 60.

The foldable mouse 200 is similar to the foldable mouse 100, except that the main body structure 12 is shorter than the first support plate 11 and the second support plate 13 along the Y-axis direction. In detail, each of the first support plate 11 and the second support plate 13 comprises a top end and a bottom end opposite to the top end, and the first end of the main body structure 12 can be flush with the top end (i.e., in the same section of the circular arc), and the second end of the main body structure 12 is spaced from the bottom end. A distance between the second end and the bottom end along the Y-axis direction can be selected according to need. In one embodiment, the distance is about 1 centimeter.

Furthermore, the first support plate 11 and the second support plate 13 of foldable mouse 200 merely comprise the first sub-support plate 131 and the third sub-support plate 111 compared with the foldable mouse 100. In detail, the first support plate 11 and the second support plate 13 is a triangular structure, comprising two straight sides and one arc side. The two straight edges extend out of the second end of the main body structure 12. The contour of the foldable mouse 200 can be remain as circular, thus the foldable mouse 200 can still be put into the disc drive after being unfolded.

At the folded state, the main body structure 12 can be suspended by the first support plate 11 and the second support plate 13, and spaced from a desktop surface where the foldable mouse 200 is placed. Both the first end and second end of the main body structure 12 are spaced from the desktop surface. Thus while the communication module 60 is a USB module, the connection wire can pass through the gap between the main body structure 12 and the desktop surface, and does not affect the movement of the foldable mouse 200.

Figure 8:
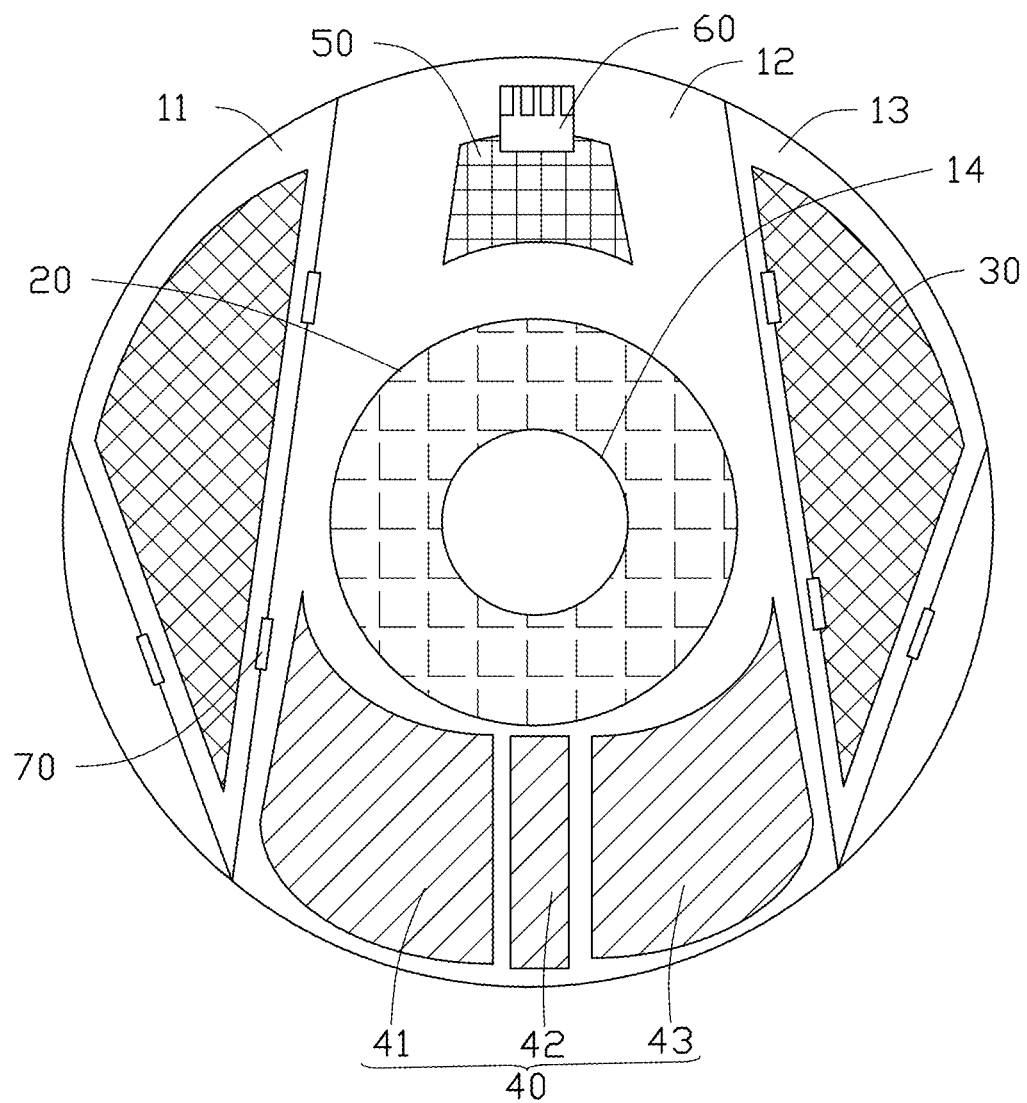
FIG. 8 shows a schematic view of another embodiment of a front view of a foldable mouse.
Figure 9:
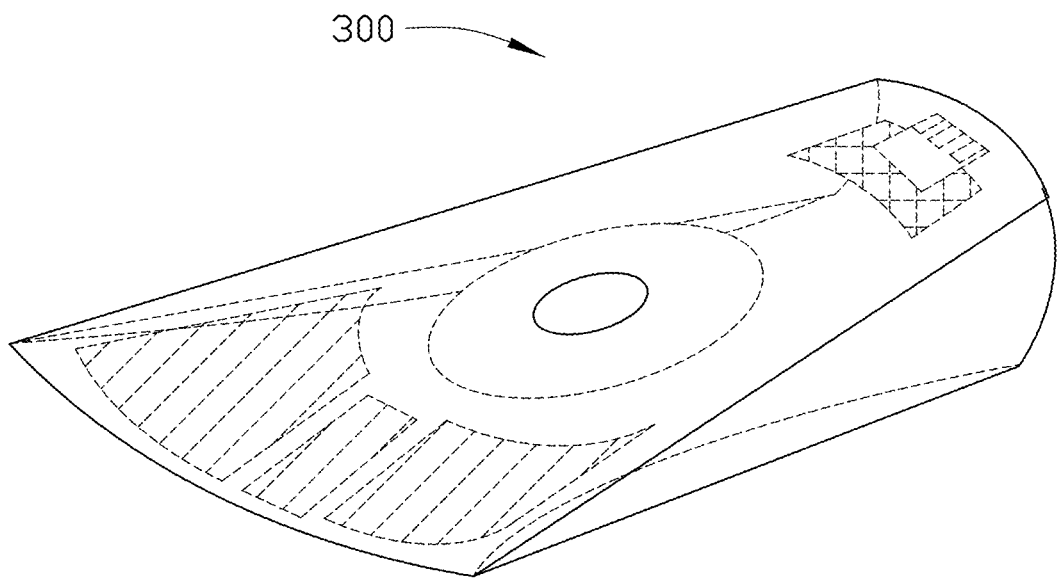
FIG. 9 shows a schematic view of one embodiment of the foldable mouse of FIG. 8 in the folded state.

Further referring to FIG. 8 and FIG. 9, one embodiment of a foldable mouse 300 comprises a substrate 10, a minidisc 20, a thin-film battery 30, a touch module 40, a signal processing module 50, and a communication module 60.

The foldable mouse 300 is similar to the foldable mouse 100, except that the foldable mouse 300 further comprises a minidisc 20.

The minidisc 20 is configured to store data, such as music, video, software, drivers, etc. Furthermore, a driver program of the foldable mouse 300 is stored into the minidisc 20. In detail, the minidisc 20 is located inside the substrate 10, and the area of the minidisc 20 is smaller than the area of the substrate 10. While the substrate 10 is circular, the diameter of the minidisc 20 is smaller than the diameter of the substrate 10, and the center of the minidisc 20 is coincident with the center of the substrate 10. The minidisc 20 can also define a through aperture which is same as the through hole 14 of the substrate 10. The minidisc 20 can be attached to the surface of the substrate 10 or integrated in the substrate 10. In one embodiment, the minidisc 20 is integrated in the main body structure 12 to reduce the thickness of the foldable mouse and save space.

While the minidisc 20 is attached to the first surface of the second surface of the substrate 10, the first surface or the second surface of the substrate 10 can have a recess (not shown), thus the minidisc 20 can be embedded in the recess and firmly fixed to the substrate 10. While the minidisc 20 is integrated into the substrate 10, the minidisc 20 share the substrate 10 as a carrier. Thus the minidisc 20 can be formed by coated functional layers and data layers on the substrate 10. Thus, it is possible to further reduce the overall thickness of the foldable mouse 300. The minidisc 20 can be distributed around the through hole 14. A diameter of the minidisc 20 can range from about 5 centimeters to about 8 centimeters. A thickness of the minidisc 20 can range from about 0.5 millimeters to about 2 millimeters. The type of minidisc 20 can be read-only type optical disc, such as CD-Audio, CD-Video, CD-ROM, DVD-Audio, DVD-Video, or DVD-ROM. The type of the minidisc 20 can also be of a recordable type, such as CD-R, CD-RW, DVD-R, DVD+R, DVD+RW, DVD-RAM, or Doublelayer DVD+R.

In one embodiment, both the minidisc 20 and the substrate 10 are circular, and the minidisc 20 is attached to the second surface of the substrate 10. The center of the minidisc 20 is coincident with the center of the substrate 10. The diameter of the minidisc 20 is about 6.4 cm, and a thickness is about 1.2 millimeters. The optical minidisc 20 is a mini CD-RW type.

While the foldable mouse 300 is folded, it can be used as an ordinary mouse to control other electronic devices. While the foldable mouse 300 is unfolded, the foldable mouse 300 can be received into the optical disc driver of the computer to store and read data. At the same time, because the minidisc 20 is integrated into the foldable mouse 300, thus the foldable mouse 300 can be used to read and write data at any time. Thus the application scope and application fields of the foldable mouse 300 can be dramatically expanded.

It is to be understood that the described embodiments are intended to illustrate rather than limit the disclosure. Any elements described in accordance with any embodiments is understood that they can be used in addition or substituted in other embodiments. Embodiments can also be used together. Variations can be made to the embodiments without departing from the spirit of the disclosure. The disclosure illustrates but does not restrict the scope of the disclosure.

Depending on the embodiment, certain of the steps of methods described can be removed, others can be added, and the sequence of steps can be altered. It is also to be understood that the description and the claims drawn to a method can comprise some indication in reference to certain steps. However, the indication used is only to be viewed for identification purposes and not as a suggestion as to an order for the steps.

What is claimed is:

1. A foldable mouse, the foldable mouse comprising:
   a substrate, wherein the substrate is a foldable structure;
   a thin-film battery, a touch module, a signal processing module, and a communication module located on the substrate, wherein the thin-film battery is electrically connected to the touch module, the signal processing module, and the communication module; and the signal processing module is configured to drive the touch module, receive signals from the touch module, and send the signals to the communication module;
   wherein the substrate comprises a main body structure sandwiched between a first support plate and a second support plate; the first support plate and the second support plate are symmetrically located at two opposite sides of the main body structure and connected to the main body structure; and the main body structure is capable of moving between an unfolded state and a folded state, wherein the main body structure, the first support plate, and the second support plate are coplanar in the unfolded state, and the main body structure is supported by the first support plate and the second support plate in the folded state; and the main body structure comprises a first surface and a second surface, and a minidisc is integrated on the second surface.

2. The foldable mouse of claim 1, wherein the main body structure is an axisymmetric structure comprising a symmetric axis, and the first support plate and the second support plate are symmetrically distributed at two opposite sides of the main body structure.

3. The foldable mouse of claim 2, wherein a shape of the substrate is circular, and a shape of each of the first support plate and the second support plate is a fan-shaped structure.

4. The foldable mouse of claim 1, wherein the first support plate is connected to the main body structure via two first micro-hinges, and the second support plate is connected to the main body structure via two second micro-hinges.

5. The foldable mouse of claim 4, wherein the first support plate is configured to rotate around the main body structure through the two first micro-hinges, and the second support plate is configured to rotate around the main body structure.

6. The foldable mouse of claim 5, wherein both the first support plate and the second support plate are capable of rotating toward the second surface.

7. The foldable mouse of claim 6, wherein the main body structure is suspended on the first support plate and the second support plate in the folded state.

8. The foldable mouse of claim 1, wherein the main body structure comprises a first end and a second end opposite to the first end, and a width of the first end is smaller than the second end.

9. The foldable mouse of claim 8, wherein the touch module is located on the second end, and the touch module comprises a first carbon nanotube film, a second carbon nanotube film, and a third carbon nanotube film attached on the second end.

10. The foldable mouse of claim 9, wherein the first carbon nanotube film, the second carbon nanotube film, and the third carbon nanotube film are spaced from each other, and the first carbon nanotube film and the third carbon nanotube film are symmetrically located at two opposite sides of the second carbon nanotube film.

11. The foldable mouse of claim 9, wherein each of the first carbon nanotube film, the second carbon nanotube film and the third carbon nanotube film comprises a plurality of carbon nanotubes oriented along a same direction.

12. The foldable mouse of claim 11, wherein the plurality of carbon nanotubes are parallel with the substrate and joined end to end via Van der Waals force.

13. The foldable mouse of claim 8, wherein the signal processing module and the communication module are located at the first end, and the thin-film battery is attached both on the first support plate and the second support plate.

14. The foldable mouse of claim 1, wherein the main body structure defines a first through hole at a center of the substrate, the minidisc defines a second through hole, and the second through hole is coincident with the first through hole.

15. A foldable mouse, the foldable mouse comprising:
a substrate, wherein a shape of the substrate is circular; the substrate comprises a main body structure, a first support plate, and a second support plate; the main body structure is an axisymmetric structure comprising a symmetric axis, and the first support plate and the second support plate are symmetrically located at two opposite sides of the main body structure; a first through hole is defined at a center of the substrate;
a plurality of first micro-hinges, wherein the first support plate is connected to the main body structure via the plurality of first micro-hinges;
a plurality of second micro-hinges, wherein the second support plate is connected to the main body structure via the plurality of second micro-hinges;
a minidisc, wherein the minidisc is attached to the main body structure, and the minidisc defines a second through hole which is coincident with the first through hole;
a touch module and a signal processing module on the main body structure, wherein the touch module comprises a carbon nanotube film attached on the main body structure;
a communication module on the substrate, wherein the communication module is electrically connected to the signal processing module to transfer data; and
a thin-film battery, wherein the thin-film battery is attached on the first support plate and the second support plate, and electrically connected to the touch module, the signal processing module, and the communication module.

16. The foldable mouse of claim 15, wherein the first support plate comprises a first sub-support plate and a second sub-support plate connected to each other, and the second support plate comprises a third sub-support plate and a fourth sub-support plate.

17. The foldable mouse of claim 16, wherein the first sub-support plate is connected to the main body structure via the plurality of first micro-hinges, and the third sub-support plate is connected to the main body structure via the plurality of second micro-hinges.

18. The foldable mouse of claim 17, wherein the second sub-support plate is connected to the first sub-support plate via a plurality of third micro-hinges, and the second sub-support plate is capable of rotating around the first sub-support plate.

19. The foldable mouse of claim 17, wherein the fourth sub-support plate is connected to the second sub-support plate via a plurality of fourth micro-hinges, and the fourth sub-support plate is capable of rotating around the third sub-support plate.

* * * * *